United States Patent
Ortega et al.

(10) Patent No.: US 6,586,563 B1
(45) Date of Patent: *Jul. 1, 2003

(54) PROCESSES FOR SYNTHESIZING ALKALI METAL BOROHYDRIDE COMPOUNDS

(75) Inventors: Jeffrey V. Ortega, Dover Township, Ocean County, NJ (US); Ying Wu, Red Bank, NJ (US); Steven C. Amendola, Ocean Township, Monmouth County, NJ (US); Michael T. Kelly, Plainsboro Township, Middlesex County, NJ (US)

(73) Assignee: Millennium Cell, Inc., Eatontown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/022,077

(22) Filed: Dec. 18, 2001

(51) Int. Cl.⁷ ................................................. C08G 79/08
(52) U.S. Cl. .................. 528/394; 528/271; 528/396
(58) Field of Search .................................. 528/271, 394, 528/396

(56) References Cited

U.S. PATENT DOCUMENTS 6,433,129 B1 * 8/2002 Amendola et al. .......... 528/271

* cited by examiner

Primary Examiner—Terressa M. Boykin
(74) Attorney, Agent, or Firm—Gibbon, Del Deo, Dolan, Griffinger and Vecchione

(57) ABSTRACT

Processes for synthesizing borohydride compounds with reduced energy requirements and high efficiency are disclosed. The processes include the reaction of a base with a borane complex or diborane to produce a borohydride compound of formula $YBH_4$, where Y is a monovalent cationic moiety.

12 Claims, No Drawings

PROCESSES FOR SYNTHESIZING ALKALI METAL BOROHYDRIDE COMPOUNDS

FIELD OF THE INVENTION

The present invention relates to processes for synthesizing borohydride compounds, and more particularly to more efficient processes for synthesizing borohydride compounds that have decreased sodium or alkali metal requirements.

BACKGROUND OF INVENTION

Sodium borohydride is an important reducing agent for many organic chemical functional groups (including aldehydes and ketones) and metal salts with various applications in pharmaceutical and fine chemical manufacturing. It can also be used as a purification agent to remove metal ions from industrial waste streams or carbonyl and peroxide impurities from process chemicals. Aqueous solutions of sodium borohydride are used in the pulp and paper industries to produce sodium hydrosulfite bleach.

In addition, sodium borohydride is being evaluated as a hydrogen source for fuel cells and hydrogen-burning internal combustion engines. Sodium borohydride can be used directly as an anodic fuel in a fuel cell or as a hydrogen storage medium (e.g., hydrogen can be liberated by the reaction of sodium borohydride with water, which produces sodium borate as a byproduct). As with all fuels, acceptance of sodium borohydride in the commercial market is partially dependent on the availability of industrial scale quantities.

Sodium borohydride is commercially prepared from the conversion of boric acid and methanol into trimethyl borate ($B(OCH_3)_3$) which is then reduced by sodium hydride to produce sodium borohydride (Equation 1). This process is essentially unchanged from that described in Schlesinger, H. I., Brown, H. C., Abraham, B., Bond, A. C., Davidson, N., Finholt, A. E., Gilbreath, J. R., Hoekstra, H. R., Horvitz, L., Hyde, E. K., Katz, J. J., Knight, J., Lad, R. A., Mayfield, D. L., Rapp, L., Ritter, R. M., Schwartz, A. M., Sheft, I., Tuck, L. D., and Walker, A. O., *"New Developments in the Chemistry of Diborane and the Borohydrides. I. General Summary," Journal of the American Chemical Society*, vol. 75 (1953), pp. 187–190 ("the Schlesinger process").

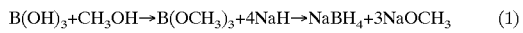

$$B(OH)_3 + CH_3OH \rightarrow B(OCH_3)_3 + 4NaH \rightarrow NaBH_4 + 3NaOCH_3 \quad (1)$$

The use of large amounts of sodium metal (4 moles needed to produce one mole of sodium borohydride) is a major factor in the manufacturing cost. According to U. S. Geologic Survey reports, the largest single use for metallic sodium in the United States is in sodium borohydride production. Sodium metal is produced by the electrolysis of molten salt mixtures of sodium chloride and calcium chloride in an energy-intensive process. Sodium hydride is prepared on-site by reaction of sodium metal with hydrogen in a mineral oil slurry.

The process described in Equation 1 provides poor molar economy by requiring 4 moles of sodium (as sodium hydride) to produce 1 mole of sodium borohydride. Based on the above stoichiometry, 75% of the sodium required is converted to a by-product, sodium methoxide. This inefficiency limits the scalability of this process. A process that utilizes sodium atoms more efficiently (i.e., more sodium atoms incorporated into desired product) would therefore be desirable. Additionally, both sodium metal and sodium hydride will react violently with water to generate hydrogen gas, and must be protected from all sources of water, usually under an inert gas atmosphere. Special engineering and safety considerations must be made to prevent possible explosive reactions between sodium and water.

The product of Equation 1 is a mineral oil dispersion of sodium borohydride and sodium methoxide. This mixture is hydrolyzed to produce a two-phase aqueous sodium hydroxide-sodium borohydride-methanol mixture; methanol is then removed from this mixture by distillation. The aqueous solution is a major commercial product; however, powder sodium borohydride is the desired reagent for use in pharmaceutical synthesis and for hydrogen generation applications. Additional extraction, evaporation, crystallization, and drying steps are necessary to obtain solid sodium borohydride.

Alternative routes to produce sodium borohydride have been evaluated in an effort to reduce manufacturing costs, but have not replaced the route shown in Equation 1, as discussed in *"Na Borohydride: can cost be lowered?", Canadian Chemical Processing*, (1963) pp. 57–62. For example. Bayer AG evaluated a solid-state reaction of borax, quartz, and sodium metal (Equation 2) under a hydrogen atmosphere; however, this approach still requires the unfavorable sodium metal stoichiometry of 4 moles per mole of sodium borohydride produced.

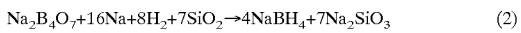

$$Na_2B_4O_7 + 16Na + 8H_2 + 7SiO_2 \rightarrow 4NaBH_4 + 7Na_2SiO_3 \quad (2)$$

Furthermore, in view of the large quantities of sodium borohydride needed for use as a hydrogen carrier, e.g., as an alternative fuel in the transportation industry, these processes would produce large quantities of waste products such as sodium methoxide or sodium silicate. Further energy and expense is required to separate these byproducts.

Most improvements found in the prior art are simple modifications of the Schlesinger and Bayer processes represented by Equations 1 and 2. Accordingly, such improvements also suffer from the disadvantages stated above and do not provide any improved efficiency. The idea process would be one in which the majority of the sodium atoms are converted to sodium borohydride product.

An alternative process which conceptually could be used to prepare sodium borohydride compounds on a large scale is the disproportionation of diborane with small, hard Lewis bases. The use of methoxide and hydroxide bases is discussed, for example, in U.S. Pat. No. 2,461,662, in Schlesinger, H. I., Brown, H. C., Hoekstra, H. R., and Rapp, L. R., *"Reactions of Diborane with Alkali Metal Hydrides and Their Addition Compounds. New Syntheses of Borohydrides", Journal of the American Chemical Society*, vol. 75 (1953), pp. 199–204; and in Davis, R. E., and Gottbrath, J. A., *"On the Nature of Stock's Hypoborate," Chemistry and Industry*, (1961) pp. 1961–1962. Not only does this result in a favorable utilization of sodium atoms as compared to the processes shown in Equations 1 and 2, it would also allow the use of air and moisture stable sodium salts (as compared to sodium hydride), which simplify handling during production.

However, this approach has not been seriously considered for commercial uses. The reaction of diborane with aqueous sodium hydroxide described in the Davis and Gottbrath article referenced above generates a mixture of products, including sodium borohydride. The methodology described in U.S. Pat. No. 2,461,662 and in the Schlesinger, Brown, Hoekstra, and Rapp article referenced above requires that gaseous diborane be condensed onto solid metal alkoxides at low temperature (ca. −100° C.).

In view of the above, there is a need for improved and energy efficient industrial scale manufacturing processes for producing borohydride compounds that eliminate the need for excess sodium or alkali metals. In addition, there is a need for industrial scale processes that reduce or avoid the production of large quantities of waste products.

SUMMARY OF THE INVENTION

The present invention provides processes for producing large quantities of borohydride compounds, which overcome the above-described deficiencies. In addition, the efficiency of the processes of the present invention can be greatly enhanced over the typical processes for producing borohydride compounds. Further, sodium carbonate (soda ash) is a readily available mined chemical mineral and requires no special handling as compared to metallic sodium or sodium hydride.

In one embodiment of the present invention, a process is provided for producing borohydride compounds which includes the reaction of a carbonate of the formula $Y_2CO_3$ in aqueous solution at a temperature of about −5 to about 20° C. with diborane to produce the borohydride $YBH_4$, where Y is a monovalent cationic moiety.

In another embodiment of the present invention, a process is provided for producing borohydride compounds which includes the reaction of a base with a borane complex, the borane complex in a solution comprising a non-aqueous aprotic solvent or a non-aqueous polar solvent, to produce the borohydride $YBH_4$, where Y is a monovalent cationic moiety and the base is selected from the group consisting of a hydroxide of the formula YOH and a carbonate of the formula $Y_2CO_3$.

In another embodiment of the present invention, a process is provided for producing borohydride compounds which includes the reaction of a base in the solid phase with gaseous diborane to produce the borohydride $YBH_4$, where Y is a monovalent cationic moiety and the base is selected from the group consisting of a hydroxide of the formula YOH and a carbonate of the formula $Y_2CO_3$. No solvent is used in this embodiment of the invention.

In another embodiment of the present invention, a process is provided for producing borohydride compounds which includes the reaction of a base suspended in a non-aqueous aprotic solvent or a non-aqueous polar solvent with gaseous diborane to produce the borohydride $YBH_4$, where Y is a monovalent cationic moiety and the base is selected from the group consisting of a hydroxide, YOH and a carbonate of the formula $Y_2CO_3$.

The stoichiometry of the above reactions can be summarized by the following equations:

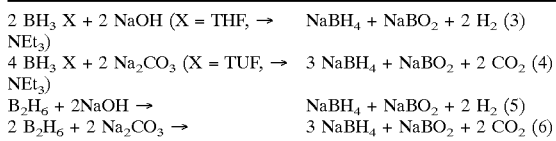

Additionally, the processes of this invention may also be integrated into an overall regeneration scheme of large volume sodium borohydride production from boron-containing ores and natural gas, such as the schemes described in U.S. patent application Ser. No. 09/710,041 and U.S. patent application Ser. No. 09/833,904 (herein incorporated by reference).

DETAILED DESCRIPTION OF THE INVENTION

The present invention includes processes for producing borohydride compounds from diborane complexes. In accordance with the present invention, these processes can be conducted in a batchwise or continuous manner, as is well-known to the skilled artisan.

The processes of the invention substantially reduce the requirement for excess quantities of sodium metal that exists in current industrial processes, thereby decreasing the energy cost commonly associated with borohydride production. About 75% of sodium from the sodium-containing starting material (sodium carbonate or sodium hydroxide) is converted to sodium borohydride in the current invention. In contrast, only about 25% of sodium from the starting materials (sodium hydride, or sodium metal, respectively) in the Schlesinger and Bayer processes is converted into sodium borohydride.

The embodiment of the present invention which utilizes a carbonate base in aqueous solution provides a novel and mild procedure for obtaining sodium borohydride. The other embodiments of the present invention describe novel reactions in non-aqueous solvents or heterogeneous reactions between a gas and a solid. The preferred non-aqueous embodiments of the invention result in high yields by avoiding an alternative reaction pathway available to diborane in the presence of water as well as the potential decomposition of the desired sodium borohydride product by water.

In one exemplary embodiment of the invention, the reaction of a carbonate in aqueous solution with diborane is performed using standard Schlenk glassware and techniques for manipulating air-sensitive materials, incorporating a dispersion tube submerged in an aqueous solution kept at about −5 to about 20° C., preferably about 0 to about 5° C., and most preferably at about 0° C. A gas inlet tube submerged in the aqueous solution may be used instead of the dispersion tube.

In another exemplary embodiment, between about one and about five molar equivalents of the carbonate may be provided in the reaction medium for every molar equivalent of diborane.

In another exemplary embodiment of the invention, the reaction of the carbonate in aqueous solution with diborane is performed in multiple reaction flasks containing sodium carbonate solutions connected in sequence, and the diborane gas stream bubbled though each flask in turn. The reaction may be performed in batch mode or in continuous mode. Preferably, the continuous mode reaction employs a gas recycle pump which can be incorporated into the reaction apparatus to recirculate the diborane through the reaction flasks.

In another exemplary embodiment of the invention, the reaction of a hydroxide or of a carbonate base in diethylene glycol dimethyl ether (diglyme) with a borane complex is performed in standard chemical glassware with stirring by a magnetic stirrer.

In one preferred embodiment, the borane complex and the base are reacted at a temperature between about −5 and about 30° C., most preferably between about 20 and about 25° C. In another preferred embodiment, the reaction time is preferably between 2 and 70 hours, most preferably between 24 and 65 hours.

In other exemplary embodiments of the invention, the reactions where one of the reactants is gaseous diborane and the other reactant is a hydroxide or a carbonate, and where the other reactant is either in the absence of solvent or suspended in diglyme, are carried out in a ballmill vessel. The vessel is rotated by a mill while milling media placed in the interior of the vessel is used to agitate the contents of the vessel. The milling media may be of any suitable nonreactive substance including, but not limited to, steel, copper, aluminum, tungsten carbide, brass thermoplastic or ceramic balls.

In one preferred embodiment, diborane and the base are reacted at a temperature between about 0 and about 70° C., most preferably between about 20 and about 25° C. In another preferred embodiment, diborane and base are reacted at pressures between about 14 psi and 200 psi, preferably between 14 and 100 psi. In another preferred embodiment, the reaction time is preferably between 2 and 100 hours, most preferably between 40 and 65 hours. In still another preferred embodiment, for every molar equivalent of diborane, between about one and about ten molar equivalents of the base may be provided in the reaction medium, preferably between about five and about ten molar equivalents of the base, most preferably between about ten molar equivalents of the base. Where solid sodium carbonate is used as the basic reactant, following isolation of sodium borohydride at the completion of the reaction, the remaining solid byproducts can be extracted by adding alcohol, preferably methanol, to remove sodium borate, which is soluble in the alcohol, from sodium carbonate, which is insoluble in the alcohol. The recovered solid sodium carbonate can be recycled for use in future disproportionation reactions.

The reactants $Y_2CO_3$ and YOH are readily available commercially from Aldrich Chemical Co., Inc. Preferably, Y is an alkali metal, a pseudo-alkali metal such as $Tl^+$, an ammonium ion, a quaternary ammonium ion of formula $NR_4^+$, wherein R is hydrogen, a straight chain $C_1$ to $C_4$ alkyl group, a branched chain $C_1$ to $C_4$ alkyl group, or a mixture thereof. More preferably, Y is $Li^+$, $Na^+$, $K^+$, $Rb^+$, $Cs^+$, $Fr^+$, $NH_4^+$, $Tl^+$, or a quaternary ammonium ion of formula $NR_4^+$, wherein R is hydrogen, a straight chain $C_1$ to $C_4$ alkyl group, or a branched chain $C_1$ to $C_4$ alkyl group. Most preferably, Y is $Na^+$, $Li^+$, or $K^+$.

The reactants diborane and borane complexes are also readily available commercially from Aldrich Chemical Co., Inc. Preferably, borane complexes are borane complexes of ethers, borane-morpholine, borane-ammonia, borane-triethylamine, borane-trimethylamine, borane-N,N-diethylaniline, borane-dimethylamine, borane-dimethylsulfide, borane-inert-butylamine, borane-diethylamine, borane-iso-propylamine and borane-pyridine. Most preferably, the borane complexes are borane-tetrahydrofuran and borane-triethylamine.

Without wishing to be bound by any theory, it is believed that small hard bases promote the asymmetric dissociation of diborane, as described, for example, in Huheey, J. E., "Inorganic Chemistry," 3$^{rd}$ Ed., HarperCollins: New York, 1983; pp. 726–731. In a concentrated aqueous sodium hydroxide solution, for example, at reduced temperatures (e.g., from about −40° C. to about 0° C.), borane undergoes disproportionation which occurs in two steps (i) asymmetric cleavage into a sodium borohydride molecule and a $BH_2^+$ fragment which coordinates two hydroxides; and thereafter (ii) disproportionation of the $BH_2^+$ fragment into an additional sodium borohydride molecule and a sodium borate molecule. The disproportionation is dependent on the anionic base and is independent of the cation moiety.

Replacement of water with a nonaqueous polar solvent or an aprotic solvent such as diglyme to minimize competitive hydrolysis of the $BH_2^+$ fragment allows the disproportionation to be achieved with higher efficiency, thereby providing greater yield. Examples of suitable aprotic solvents include: hydrocarbons, such as mineral oil, hexane or heptane; amides, such as dimethylacetamide; ethers, preferably organic glymes, such as diglyme and tetra(ethylene glycol) dimethyl ether (tetraglyme). Water can also be replaced with a nonaqueous polar solvent, such as methanol, ethanol, propanol, and isopropanol.

The scope of the present invention may be further illustrated by the examples below. In all cases, analysis of the sodium borohydride produced was carried out by infrared spectroscopy (IR), proton and boron nuclear magnetic resonance ($^1$H NMR and $^{11}$B NMR), and by powder X-ray diffraction (KRD). The IR spectra (KBr pellets) were obtained on a Nicolet Nexus 670 FT-IR. The NMIR spectra were obtained by a Bruker 200 MHz magnet fitted with a tecmag DSPect synthesizer and a NTNMR software package using deuterium oxide ($D_2O$) with tetramethylsilane (TMS) as internal $^1$H reference and $BF_3$-ether complex was used as the external $^{11}$B reference. The X-ray diffraction patterns were obtained using graphite-monochromatized CuKα radiation on a Siemens D-500 diffractometer and matched to the XRD database file for sodium borohydride. The IR and NMR spectra of the products obtained in these experiments were compared with sodium borohydride literature values described in Adams, R. M., "Boron and Boron Compounds," Wiley (Interscience), New York, 1961. FT-IR (KBr): $V_{BH\ stretch}$ 2383 (vs), 2289 (vs), 2222 (vs), $V_{BH\ bend}$ 1124 (vs) cm$^{-1}$. $^1$H NMR (200.1 MHz, $D_2O$): δ −1.55 ppm (q, $J_{B-H}$=82 Hz). $^{11}$B NMR (62.4 M/Hz, $D_2O$): δ41.2 ppm (p, $J_{B-H}$=82 Hz). The following abbreviations are used: mmol for millimole, mg for milligram, mL for milliliter, vs for very sharp, MHz for megahertz, and FT-IR for Fourier transform infrared spectroscopy.

All experiments were carried out under a nitrogen atmosphere using standard Schlenk techniques.

EXAMPLE 1

(Borane-terahydrofuran Complex with NaOH/in Diglyme)

A round bottom flask was charged with sodium hydroxide (800 mg, 20 mmol, 1 equivalent) and evacuated and backfilled with nitrogen three times. Under nitrogen, diglyme (25 mL) was added. Then a 1.0 M solution borane-tetrahydrofuran complex in THF (20 mL, 20 mmol) was added via syringe. The reaction mixture was stirred at room temperature for 67 h, and the solution was degassed by bubbling nitrogen through the solution for 30 min. The white precipitate was removed by filtration. The filtrate was concentrated by rotary evaporation, and the resulting white powder extracted with iso-propylamine (100 mL). The filtrate was collected and the solvent removed by rotary evaporation to yield 127.6 mg of sodium borohydride (22.5%).

EXAMPLE 2

(Borane-triethylamine Complex with NaOH in Diglyme)

Using the procedure described in Example 1, borane-triethylamine complex (1.48 mL, 10 mmol) and sodium hydroxide (400 mg, 10 mmol, 1 equivalent) were stirred in diglyme for 23 h to give 24.3 mg of $NaBH_4$ (8.5%).

EXAMPLE 3

(Borane-tetrahydrofuran Complex with $Na_2CO_3$ in Diglyme)

Using the procedure described in Example 1, borane-tetrahydrofuran complex (20 mL, 20 mmol) and sodium carbonate (1.06 g, 10 mmol, 0.5 equivalents) were stirred in diglyme for 138 h to give 80.6 mg of NaBH$_4$ (14.2%).

EXAMPLE 4

(Borane-triethylamine Complex with Na$_2$CO$_3$ in Diglyme)

Using the procedure described in Example 1, borane-triethylamine complex (1.48 mL, 10.0 mmol) and sodium carbonate (530.0 mg, 5.0 mmol) were stirred in diglyme for 72 h to give 10.5 mg of NaBH$_4$ (3.7%).

EXAMPLE 5

(Dry ball-mill Reaction Using Na$_2$CO$_3$ and Diborane)

A ball-mill reaction vessel was constructed of a 316 stainless steel pipe (2 inch diameter, 4 inch length) threaded on each end to caps fitted with plug-valves and hose barbs. An excess of sodium carbonate (7.55 g, 71.2 mmol, 10 equivalents) was placed into this reaction vessel. The reaction vessel was evacuated and backfilled with nitrogen three times, then evacuated one last time before charging with 1 atm of diborane gas (170 mL, 7.12 mmol). The contents were milled with ceramic (Al$_2$O$_3$) ⅜ inch balls for 47 h at room temperature.

On completion of the reaction, nitrogen was used to flush the apparatus of excess diborane into acetone-filled scrubbers before adding diglyme (50 mL) in order to extract the sodium borohydride produced. The white precipitate (excess sodium carbonate and sodium borate) was isolated by filtration, and the filter cake was extracted with diglyme (2×50 mL). The sodium borate was separated from the excess sodium carbonate by rinsing the precipitate with methanol. The filtrates were combined and concentrated by rotary evaporation. The resulting white solid was dried under vacuum overnight to give 214.3 mg of sodium borohydride (53.0%). The purity was determined by hydrogen evolution studies (hydrolysis of sodium borohydride with dilute acid) referenced to a standard measurement to give 70.0% of the theoretical hydrogen evolved for an actual yield of 37.1%.

EXAMPLE 6

(Ball-mill Reaction in Diglyme Using Na$_2$CO$_3$ and Diborane)

Using the procedure described in Example 5, diborane was reacted with 10 equivalents Na$_2$CO$_3$ in diglyme for 65 h at room temperature to give a 65.7% yield of sodium borohydride. The purity was determined by the addition of acid to give 71.6% of the theoretical hydrogen evolved for an actual yield of 47.0%.

EXAMPLE 7

(Aqueous Reaction at 0° C. Between Diborane and Na$_2$CO$_3$)

Diborane (230.5 mL, 10 mmol) was bubbled slowly through a sintered glass frit of a dispersion tube into an aqueous solution of sodium carbonate (5.3 g, 50 mmol, 5 equivalents) in water 25 mL) at 0° C. After the addition was complete, nitrogen was bubbled through the aqueous solution in order to remove any unreacted diborane. The reaction mixture was allowed to warm to room temperature before removing the water by rotary evaporation. The resulting white powder was extracted with iso-propylamine (3×40 mL), and the combined washings were concentrated by rotary evaporation to give 55.8 mg (9.8%) sodium borohydride.

EXAMPLE 8

Dry ball-mill Reaction Between Diborane and NaOH)

Using the procedure described in Example 5, diborane was reacted with 10 equivalents or 41 h at room temperature to give a 5.3% yield of sodium borohydride.

EXAMPLE 9

(Ball-mill Reaction in Diglyme Between Diborane and NaOH)

Using the procedure described in Example 5, diborane was reacted with 10 equivalents or 41 h at room temperature to give a 23.5% yield of sodium borohydride.

It should be understood that various changes and modifications to the preferred embodiments herein will be apparent to those skilled in the art. Such changes and modifications can be made without departing from the spirit and scope of this invention and without diminishing its attendant advantages. It is therefore intended that such changes and modifications be covered by the appended claims.

What is claimed is:

1. A process for producing borohydride compounds, wherein the process comprises reacting a borane complex in a solution comprising a non-aqueous aprotic solvent or a non-aqueous polar solvent with a base, thereby providing a borohydride compound of formula YBH$_4$, wherein Y is a monovalent cationic moiety and the base is selected from the group consisting of a hydroxide of formula YOH and a carbonate of formula Y$_2$CO$_3$.

2. The process according to claim 1, wherein Y is selected from the group consisting of alkali metals, pseudo-alkali metals, and a quaternary ammonium ion of formula NR$_4^+$ wherein R is a straight chain C$_1$ to C$_4$ alkyl group, a branched chain C$_1$ to C$_4$ alkyl group, or a mixture thereof.

3. The process according to claim 1, wherein Y is selected from the group consisting of Li$^+$, Na$^+$, K$^+$, Rb$^+$, Cs$^+$, Fr$^+$, Tl$^+$, and a quaternary ammonium ion of formula NR$_4^+$, wherein R is a straight chain C$_1$ to C$_4$ alkyl group or a branched chain C$_1$ to C$_4$ alkyl group.

4. The process according to claim 3, wherein Y is selected from the group consisting of Na$^+$, Li$^+$, and K$^+$.

5. The process according to claim 1, wherein the borane complex is in solution in a non-aqueous aprotic solvent, and said solvent is an organic glyme.

6. The process according to claim 1, wherein the borane complex and the base are reacted at a temperature between about −5 and about 30° C.

7. The process according to claim 1, wherein the borane complex and the base are reacted for a time period between 2 and 70 hours.

8. The process according to claim 1, wherein the borane complex is selected from the group consisting of borane-tetrahydrofuran, borane-morpholine, borane-ammonia, borane-triethylamine, borane-trimethylamine, borane-N,N-diethylaniline, borane-dimethylamine, borane-dimethylsulfide, borane-tert-butylamine, borane-diethylamine, borane-iso-propylamine and borane-pyridine.

9. The process according to claim 8, wherein the borane complex is selected from the group consisting of borane-tetrahydrofuran and borane-triethylamine.

10. A process for producing borohydride compounds, comprising,
(a) reacting gaseous diborane with a carbonate of formula $Y_2CO_3$ in the solid phase the absence of solvent, thereby providing a borohydride of formula $YBH_4$, a borate of formula $YBO_2$, and unreacted solid carbonate, where Y is sodium;
(b) isolating the borohydride;
(c) adding an alcohol, wherein the borate is substantially soluble in the alcohol and the unreacted solid sodium carbonate is substantially insoluble in the alcohol; and
(d) isolating the unreacted sodium solid carbonate.

11. A process for producing borohydride compounds, comprising:
(a) reacting gaseous diborane with a carbonate of formula $Y_2CO_3$ suspended in a non-aqueous aprotic solvent or a non-aqueous polar solvent, thereby providing a borohydride of formula $YBH_4$, a borate of formula $YBO_2$, and unreacted solid carbonate, where Y is sodium;
(b) isolating the borohydride;
(c) adding an alcohol, wherein the borate is substantially soluble in the alcohol and the unreacted solid sodium carbonate is substantially insoluble in the alcohol; and
(d) isolating the unreacted solid sodium carbonate.

12. A process for producing borohydride compounds, comprising:
(a) reacting a borane complex in a solution comprising a non-aqueous polar solvent with a carbonate of formula $Y_2CO_3$ suspended therein, thereby providing a borohydride of formula $YBH_4$, a borate of formula $YBO_2$, and unreacted solid carbonate, where Y is sodium;
(b) isolating the borohydride;
(c) adding an alcohol to the borate and the unreacted solid carbonate, wherein the borate is substantially soluble in the alcohol and the unreacted solid sodium carbonate is substantially insoluble in the alcohol; and
(d) isolating the unreacted solid sodium carbonate.

\* \* \* \* \*